(12) United States Patent
Liu et al.

(10) Patent No.: US 10,070,140 B2
(45) Date of Patent: Sep. 4, 2018

(54) METHOD AND APPARATUS FOR QUANTIZATION MATRIX SIGNALING AND REPRESENTATION IN SCALABLE VIDEO CODING

(71) Applicant: HFI INNOVATION INC., Zhubei, Hsinchu County (TW)

(72) Inventors: Shan Liu, San Jose, CA (US); Shaw-Min Lei, Zhubei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 129 days.

(21) Appl. No.: 14/779,600

(22) PCT Filed: Mar. 20, 2014

(86) PCT No.: PCT/CN2014/073772
§ 371 (c)(1),
(2) Date: Sep. 24, 2015

(87) PCT Pub. No.: WO2014/166328
PCT Pub. Date: Oct. 16, 2014

(65) Prior Publication Data
US 2016/0050436 A1    Feb. 18, 2016

Related U.S. Application Data

(60) Provisional application No. 61/809,508, filed on Apr. 8, 2013.

(51) Int. Cl.
*H04N 19/169* (2014.01)
*H04N 19/36* (2014.01)
(Continued)

(52) U.S. Cl.
CPC ......... *H04N 19/188* (2014.11); *H04N 19/124* (2014.11); *H04N 19/157* (2014.11);
(Continued)

(58) Field of Classification Search
None
See application file for complete search history.

(56) References Cited

U.S. PATENT DOCUMENTS

2006/0008009 A1    1/2006  Bao et al.
2006/0251169 A1*  11/2006  Wang .................. H04N 19/105
                                                       375/240.12
(Continued)

FOREIGN PATENT DOCUMENTS

WO        2008084184 A2    7/2008
WO     WO 2013/032794       3/2013

OTHER PUBLICATIONS

EPO, European Search Opinion for EP 14783469 (dated Aug. 9, 2016).*

(Continued)

*Primary Examiner* — David N Werner
(74) *Attorney, Agent, or Firm* — Oblon, McClelland, Maier & Neustadt, L.L.P.

(57) ABSTRACT

A method and apparatus of scaling list data signaling for inter-layer or inter-view sharing of the scaling list data from a reference layer or a reference view in a scalable or three-dimensional video coding system are disclosed. A first flag may be incorporated in the current bitstream to indicate the scaling list data sharing from a reference layer or view. When the first flag exists and the first flag has a first value, the scaling list data for the current layer or the current view is determined from a reference bitstream for a reference layer or a reference view. When the first flag exists and the first flag has a second value, the scaling list data for the current layer or the current view is determined from the current bitstream.

9 Claims, 5 Drawing Sheets

(51) Int. Cl.

| | |
|---|---|
| *H04N 19/31* | (2014.01) |
| *H04N 19/39* | (2014.01) |
| *H04N 19/157* | (2014.01) |
| *H04N 19/124* | (2014.01) |
| *H04N 19/176* | (2014.01) |
| *H04N 19/70* | (2014.01) |
| *H04N 19/187* | (2014.01) |
| *H04N 19/463* | (2014.01) |
| *H04N 19/597* | (2014.01) |
| *H04N 19/30* | (2014.01) |
| *H04N 19/59* | (2014.01) |

(52) U.S. Cl.
CPC ......... *H04N 19/176* (2014.11); *H04N 19/187* (2014.11); *H04N 19/30* (2014.11); *H04N 19/31* (2014.11); *H04N 19/36* (2014.11); *H04N 19/39* (2014.11); *H04N 19/463* (2014.11); *H04N 19/597* (2014.11); *H04N 19/70* (2014.11); *H04N 19/59* (2014.11)

(56) References Cited

U.S. PATENT DOCUMENTS

| | | | |
|---|---|---|---|
| 2008/0137753 A1 | 6/2008 | He | |
| 2009/0147860 A1 | 6/2009 | Pandit et al. | |
| 2010/0166067 A1* | 7/2010 | Park | H04N 19/30 375/240.12 |
| 2013/0208792 A1* | 8/2013 | He | H04N 19/00569 375/240.12 |
| 2013/0215975 A1* | 8/2013 | Samuelsson | H04N 19/70 375/240.25 |
| 2013/0243093 A1* | 9/2013 | Chen | H04N 19/597 375/240.16 |
| 2014/0161175 A1* | 6/2014 | Zhang | H04N 19/597 375/240.02 |

OTHER PUBLICATIONS

International Search Report dated Jun. 23, 2014, issued in application No. PCT/CN2014/073772.

Rusert, T., et al.; "Inter-layer SPS prediction for HEVC extensions;" Joint Collaborative Team on Video Coding (JCT-VC) of ITU-T SG 16 WP 3 and ISO/IEC JTC 1/SC 29/WG 11; Jan. 2013; pp. 1-8.

Tanaka, J., et al.; "Enhancement of quantization matrix coding for HEVC;" Joint Collaborative Team on Video Coding (JCT-VC) of ITU-T SG 16 WP 3 and ISO/IEC JTC 1/SC 29/WG 11; Jul. 2011; pp. 1-11.

Liu, S., et al.; "AHG9: On Scaling List Signalling for SHVC;" Joint Collaborative Team on Video Coding (JCT-VC) of ITU-T SG 16 WP 3 and ISO/IEC JTC 1/SC 29/WG 11; Apr. 2013; pp. 1-4.

Deshpande, S., et al.; "On Scaling List Data Signaling;" Joint Collaborative Team on Video Coding (JCT-VC) of ITU-T SG 16 WP 3 and ISO/IEC JTC 1/SC 29/WG 11; Aug. 2013; pp. 1-10.

Pettersson, M., et al.; "MV-HEVC/SHVC HLS: Inter-layer scaling list inheritance for HEVC extensions;" Joint Collaborative Team on Video Coding (JCT-VC) of ITU-T SG 16 WP 3 and ISO/IEC JTC 1/SC 29/WG 11; Aug. 2013; pp. 1-6.

C. Andrew Segall, et al. "Spatial Scalability Within the H.264/AVC Scalable Video Coding Extension" IEEE Transactions on Circuits and Systems for Video Technology, vol. 17, No. 9, Sep. 2007, pp. 1121-1135.

Combined Chinese Office Action and Search Report dated Aug. 16, 2017 in Chinese Patent Application No. 201480019784.0 (with English translation of Category of Cited Documents).

* cited by examiner

| seq_parameter_set_rbsp( ) { | Descriptor |
|---|---|
| ... ... | |
| scaling_list_enabled_flag | u(1) |
| if( scaling_list_enabled_flag ) { | |
|   sps_scaling_list_data_present_flag | u(1) |
|   if( sps_scaling_list_data_present_flag ) | |
|     sps_base_pred_scaling_list_flag | u(1) |
|     if( !sps_base_pred_scaling_list_flag ) | |
|       scaling_list_data( ) | |
| } | |
| ... ... | |
| rbsp_trailing_bits( ) | |
| } | |

FIG.2

| pic_parameter_set_rbsp( ) { | Descriptor |
|---|---|
| ... ... | |
| pps_scaling_list_data_present_flag | u(1) |
| if( pps_scaling_list_data_present_flag ) | |
|   pps_base_pred_scaling_list_flag | u(1) |
|   if( !pps_base_pred_scaling_list_flag ) | |
|     scaling_list_data( ) | |
| } | |
| ... ... | |
| rbsp_trailing_bits( ) | |
| } | |

FIG.3

| scaling_list_data( ) { | Descriptor |
|---|---|
|   for( sizeId = 0; sizeId < 4; sizeId++ ) | |
|     for(matrixId = 0; matrixId < (( sizeId = = 3) ? 2 : 6 ); matrixId++) { | |
|       scaling_list_pred_mode_flag[ sizeId ][ matrixId ] | u(1) |
|       if( !scaling_list_pred_mode_flag[ sizeId ][ matrixId ] ) | |
|       base_pred_scaling_list_flag | u(1) |
|       If (!base_pred_scaling_list_flag ) | |
|         scaling_list_pred_matrix_id_delta[ sizeId ][ matrixId ] | ue(v) |
|       else { | |
|         nextCoef = 8 | |
|         coefNum = Min( 63, ( 1 << ( 4 + ( sizeId << 1 ) ) ) - 1 ) | |
|         ... ... | |
|       } | |
|     } | |
| } | |

FIG.4

METHOD AND APPARATUS FOR QUANTIZATION MATRIX SIGNALING AND REPRESENTATION IN SCALABLE VIDEO CODING

CROSS REFERENCE TO RELATED APPLICATIONS

The present application is a national stage application of PCT/CN2014/073772, filed Mar. 20, 2014, which claimed priority to U.S. Provisional Patent Application, No. 61/809,508, filed on Apr. 8, 2013, entitled "On Quantization Matrix Signalling and Representation for Scalable Video Coding and 3D Video Coding". The U.S. Provisional Patent Application is hereby incorporated by reference in its entirety.

TECHNICAL FIELD

The present invention relates to scalable video coding or three-dimensional/multi-view video coding. In particular, the present invention relates to sharing quantization matrices among different layers or different views in order to improve coding efficiency.

BACKGROUND

Video streaming has become a mainstream for video delivery today. Supported by the high-speed ubiquitous internet as well as mobile networks, video contents can be delivered to end users for viewing on different platforms with different qualities. In order to fulfill different requirements for various video stream applications, a video source may have to be processed or stored at different resolutions, frame rates, and/or qualities. It would result in fairly complicated system and require high overall bandwidth or large overall storage space. One solution to satisfy requirements for different resolutions, frame rates, qualities and/or bitrates is scalable video coding. Beside various proprietary development efforts to address this problem, there is also an existing video standard for scalable video coding. The joint video team (JVT) of ISO/IEC MPEG and ITU-T VCEG has standardized a Scalable Video Coding (SVC) extension to the H.264/AVC standard. An H.264/AVC SVC bitstream can contain video information ranging from low frame-rate, low resolution and low quality to high frame rate, high definition and high quality. This single bitstream can be adapted to a specific application by properly configuring the scalability of the bitstream. For example, the complete bitstream corresponding to a high definition video can be delivered over high-speed networks to provide full quality intended for viewing on large screen TV. A portion of the bitstream corresponding to a low-resolution version of the high definition video can be delivered over legacy cellular networks for intended viewing on handheld/mobile devices. Accordingly, a bitstream generated using H.264/AVC SVC is suitable for various video applications such as video broadcasting, video streaming, and surveillance.

In SVC, three types of scalabilities, i.e., temporal scalability, spatial scalability, and quality scalability are provided. SVC uses a multi-layer coding structure to render three dimensions of scalability. The concept of SVC is to generate one scalable bitstream that can be easily and quickly adapted to fit the bit-rate of various transmission channels, diverse display capabilities, and/or different computational resources without the need of transcoding or re-encoding. An important feature of SVC design is to provide scalability at the bitstream level. Bitstreams for a reduced spatial and/or temporal resolution can be simply obtained by discarding NAL units (or network packets) that are not required for decoding the target resolution. NAL units for quality refinement can be additionally truncated in order to reduce the bit-rate and/or the corresponding video quality.

In the H.264/AVC SVC extension, spatial scalability is supported based on the pyramid coding. First, the video sequence is down-sampled to smaller pictures with different spatial resolutions (layers). The lowest layer (i.e., the layer with lowest spatial resolution) is called a base layer (BL). Any layer above the base layer is called an enhancement layer (EL). In addition to dyadic spatial resolution, the H.264/AVC SVC extension also supports arbitrary resolution ratios, which is called extended spatial scalability (ESS). In order to improve the coding efficiency of the enhancement layers (video layers with larger resolutions), various inter-layer prediction schemes have been disclosed in the literature. Three inter-layer prediction tools have been adopted in SVC, including inter-layer motion prediction, inter-layer Intra prediction and inter-layer residual prediction (e.g., C. Andrew Segall and Gary J. Sullivan, "Spatial Scalability Within the H.264/AVC Scalable Video Coding Extension", IEEE Transactions on Circuits and Systems for Video Technology, Vol. 17, No. 9, Pages 1121-1135, September 2007).

FIG. 1 illustrates an example of spatial scalability design according to H.264/AVC SVC. Base layer encoder 110 receives a lower resolution video sequence as input and encodes the low-resolution sequence using conventional H.264/AVC video coding. Coding mode selection 112 can select a prediction mode between Intra-prediction and motion-compensated Inter-prediction. Enhancement layer encoder 120 receives a higher resolution sequence as input. The higher resolution sequence can be encoded with a structure similar to the conventional H.264/AVC coding. However, inter-layer prediction 130 can be used as an additional coding mode. Accordingly, mode selection 122 for the enhancement layer can select a prediction mode among Intra-prediction, motion-compensated Inter-prediction and inter-layer prediction. For the case of Intra-coded blocks in the base layer, reconstructed blocks provide a prediction for the enhancement layer. For the case of Inter-coded blocks in the base layer, motion vectors and residual difference information of the base layer can be used to predict those of the enhancement layer. While two resolution layers are shown in FIG. 1 as an example of spatial scalability according to H.264/AVC SVC, more resolution layers can be added, which a higher-resolution enhancement layer can use either the base layer or previously transmitted enhancement layers for inter-layer prediction. Furthermore, other forms of SVC enhancement (e.g., temporal or quality) may also be present in the system.

HEVC (High Efficiency Video Coding) is an advanced video coding system developed under the Joint Collaborative Team on Video Coding (JCT-VC) group of video coding experts from ITU-T Study Group. HEVC utilizes very flexible data structure including coding unit (CU), prediction unit (PU) and transform unit (TU). The CU, PU and TU can be partitioned into smaller blocks. Usually, rate-distortion cost is used to select best partitions for the CUs, PUs and TUs. The scalable coding system may also be based on HEVC and the HEVC-based scalable video coding system is named SHVC.

Both AVC/H.264 and HEVC are block-based coding system, where the picture is divided into coding blocks. For AVC/H.264, the picture is divided into macroblocks and each luma macroblock (i.e., Y component) consists of 16×16 pixels. For HEVC, the picture is divided into largest coding units (LCUs) and each CU may be further partitioned into smaller CUs until the smallest CU is reached. Each macroblock or CU is then predicted using Inter or Intra prediction to generate residues for the macroblock or CU. The residues of the macroblock or CU are divided into TUs and each TU is processed by two-dimensional transform. The transform coefficients of each TU are quantized using a quantization matrix. The quantized transform coefficients are coded using entropy coding to form part of the coded bitstream.

Information associated with the quantization matrices, also called scaling list data, usually is incorporated in the coded bitstream so that a decoder can apply inverse quantization accordingly. For AVC, the scaling list data is provided for block sizes 4×4 and 8×8, Inter and Intra prediction modes, and different color components (i.e., Y, Cb and Cr) individually. For HEVC, the scaling list data is provided for block sizes 4×4 and 8×8 similar to AVC. In addition, the scaling list data for block sizes 16×16 and 32×32 is also provided. For 16×16, the scaling list data is provided for Inter and Intra prediction modes and color components Y, Cb and Cr individually, where the 16×16 matrices are up-sampled from the corresponding 8×8 matrices. For 32×32, the scaling list data is provided for Inter and Intra prediction modes and Y component individually, where the 32×32 matrices are up-sampled from the corresponding 8×8 matrices.

For scalable system based on SVC, the set of quantization matrices similar to AVC are signalled for each layer. For scalable system based on SHVC, the set of quantization matrices similar to HEVC are signalled for each layer. Therefore, the scaling list data grows with the number of layers. In a multi-view coding system, the scaling list data may have to be signalled for each view and the scaling list data grows with the number of views. It is desirable to reduce the required scaling list data for a scalable system or a three-dimensional/multi-view system.

SUMMARY

A method and apparatus of scaling list data signaling by sharing the scaling list data with a reference layer or a reference view for a scalable or three-dimensional video decoding system are disclosed. The method according to the present invention receives coded data associated with a current block in a current layer or a current view from a current bitstream and determines whether a first flag exists in the current bitstream. When the first flag exists and the first flag has a first value, the scaling list data for the current layer or the current view is determined from a reference bitstream for a reference layer or a reference view. When the first flag exists and the first flag has a second value, the scaling list data for the current layer or the current view is determined from the current bitstream. The scaling list data determined is then used in the decoding process for the coded data associated with the current block.

In one embodiment, the first flag is located in a sequence parameter set (SPS) of the current bitstream when the first flag exists. In another embodiment, the first flag is located in a picture parameter set (PPS) of the current bitstream when the first flag exists. The existence of the first flag may be indicated by a scaling list data presence flag in the current bitstream. When the first flag is not present in the current bitstream, the first flag is inferred to have the first value.

A method and apparatus of scaling list data signaling by sharing the scaling list data with a reference layer or a reference view for a scalable or three-dimensional video encoding system are disclosed. The method according to the present invention receives input data associated with a current block in a current layer or a current view from a current bitstream, and then processes the input data using a current scaling list. The determination of the current scaling list data is signalled using a first flag, wherein a first value is assigned to the first flag when the scaling list data for the current layer or the current view is inferred from a reference layer or a reference view, and a second value is assigned to the first flag when the current layer or the current view uses own scaling list data. The scaling list data for the current layer or the current view is incorporated in a current bitstream for the current layer or the current view when the first flag has the second value, and otherwise the scaling list data for the current layer or the current view is not incorporated in the current bitstream.

BRIEF DESCRIPTION OF DRAWINGS

FIG. 2 illustrates an exemplary syntax design for sequence parameter set according to an embodiment of the present invention to support sharing of the scaling list data with a reference layer.

FIG. 3 illustrates an exemplary syntax design for picture parameter set according to an embodiment of the present invention to support sharing of the scaling list data with a reference layer.

FIG. 4 illustrates an exemplary syntax design for scaling list data according to an embodiment of the present invention to support sharing of the scaling list data with a reference layer.

DETAILED DESCRIPTION

Figure 1:
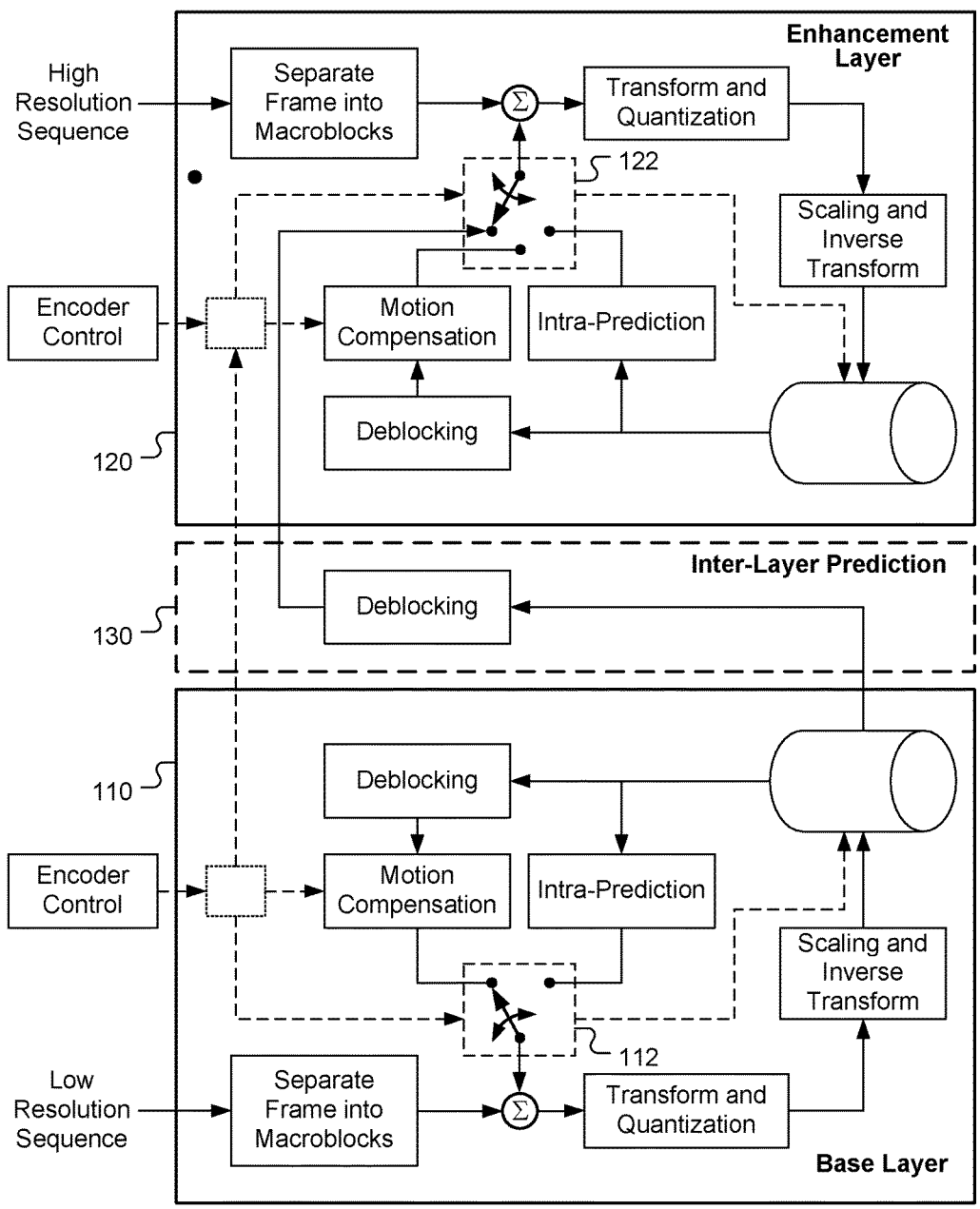
FIG. 1 illustrates an exemplary system block diagram for two-layer scalable coding based on the H.264/AVC scalable coding standard.

In SVC and SHVC, the scaling list (quantization matrix) information is signalled and processed independently in different spatial and quality layers. Due to the high correlation among the temporal collocated pictures among different spatial and quality layers, the same set of scaling lists (i.e. quantization matrices) may be used among different spatial and quality layers. To remove the redundancy of signalling scaling list information as in the conventional systems, embodiments of the present invention allow sharing scaling lists of a reference layer by higher (enhancement) layers in the scalable video coding system. The present invention may also be extended to three-dimensional or multi-view coding system to share scaling lists of a reference view by dependent views.

In the first embodiment, the scaling list data may be incorporated in the sequence level such as the sequence parameter set (SPS) as indicated by a sequence level list-data present flag (e.g., sps_scaling_list_data_present_flag). The sequence level list-data present flag indicates whether the scaling list data is incorporated in the sequence level or not. If the sequence level list-data present flag has a first specified value (e.g., sps_scaling_list_data_present_flag=1), the scaling list data is carried in the SPS. If the sequence level list-data present flag has a second specified value, (e.g., sps_scaling_list_data_present_flag=0), the scaling list data is not present in the SPS. If the sequence level list-data present flag is not present, the sequence level list-data present flag is inferred to have the second specified value. In the case that a control flag (e.g., scaling_list_enabled_flag) indicates that the scaling list data is enabled and the sequence level list-data present flag has the second specific value (i.e., sps_scaling_list_data_present_flag=0), the scaling list data is determined as follows:

When the current video data is the base-layer (e.g., as indicated by nuh_layer_id=0), a default scaling list data is used. For example, the default scaling list data may be used to derive the array ScalingFactor as described in the scaling list data semantics specified in the SHVC standard.

When the current video data is an enhancement layer (e.g., as indicated by nuh_layer_id>0) having block size 16×16 or 32×32 (e.g., as indicated by sizeID=2 or 3) and the base layer conforms to the single layer or single view standard (e.g., AVC or HEVC) instead of the scalable or multi-view standard (e.g., SVC or SHVC), default scaling list data is used. For example, the default scaling list data for 8×8 block size may be up-scaled to derive the array ScalingFactor for 16×16 and 32×32 block size as described in the scaling list data semantics specified in the SHVC standard.

Otherwise, the scaling list data of the reference layer is used. For example, the scaling list data is used to derive the array ScalingFactor. The reference layer can be the immediate lower layer or the base layer, or can be indicated by a reference_layer_id.

The scaling list data may be incorporated in the picture level such as the picture parameter set (PPS) as indicated by a picture level list-data present flag (e.g., pps_scaling_list_data_present_flag). The picture level list-data present flag indicates whether to modify the scaling list data incorporated in active sequence parameter set. If the picture level list-data present flag has a first specified value (e.g., pps_scaling_list_data_present_flag=1), the scaling list data in the PPS is used to modify the scaling list data in the SPS. If the picture level list-data present flag has a second specified value, (e.g., pps_scaling_list_data_present_flag=0), the scaling list data for the picture uses the scaling list data in the active SPS. If the control flag indicates that the scaling list data is disabled (e.g., scaling_list_enabled_flag=0), the picture level list-data present flag shall have the second specified value (i.e., pps_scaling_list_data_present_flag=0). In the case that the control flag indicates that the scaling list data is enabled (e.g., scaling_list_enabled_flag=1), the sequence level list-data present flag has the second specific value (i.e., sps_scaling_list_data_present_flag=0), and the picture level list-data present flag also has the second specified value (i.e., pps_scaling_list_data_present_flag=0). the scaling list data is determined as follows:

When the current video data is the base-layer (e.g., as indicated by nuh_layer_id=0), a default scaling list data is used. For example, the default scaling list data may be used to derive the array ScalingFactor as described in the scaling list data semantics specified in the SHVC standard.

When the current video data is an enhancement layer (e.g., as indicated by nuh_layer_id>0) having block size 16×16 or 32×32 (e.g., as indicated by sizeID=2 or 3) and the base layer conforms to the single layer or single view standard (e.g., AVC or HEVC) instead of the scalable or multi-view standard (e.g., SVC or SHVC), default scaling list data is used. For example, the default scaling list data for 8×8 block size may be up-scaled to derive the array ScalingFactor for 16×16 and 32×32 block size as described in the scaling list data semantics specified in the SHVC standard.

Otherwise, the scaling list data of the reference layer is used. For example, the scaling list data is used to derive the array ScalingFactor. The reference layer can be the immediate lower layer or the base layer, or can be indicated by a reference_layer_id.

In the second embodiment, a new flag is used in the sequence level to indicate whether the scaling list data is inferred from the scaling list data in the reference layer sequence parameter set when the sequence level list-data flag indicates that scaling list data exists in the sequence level. An exemplary syntax design to facilitate the embodiment is illustrated in FIG. 2. The new syntax element, sps_base_pred_scaling_list_flag is introduced in the SPS. As shown in FIG. 2, sps_base_pred_scaling_list_flag is signalled if sps_scaling_list_data_present_flag is equal to 1. sps_base_pred_scaling_list_flag with a first value (e.g., 1) indicates that the scaling list data is inferred from the scaling list data in the reference layer SPS. sps_base_pred_scaling_list_flag with a second value (e.g., 0) indicates that scaling list data is present in the SPS. If the reference layer is the base layer and the avc_base_layer_flag in vps_extension ( ) is 1 (i.e., the base layer conforms to the AVC standard), sps_base_pred_scaling_list_flag shall have the second value (i.e., 0). When sps_base_pred_scaling_list_flag is not present in the SPS, the value is inferred to have the second value (i.e. 0).

Furthermore, in the second embodiment, the new flag may also be used in the picture level to indicate whether the scaling list data is inferred from the scaling list data in the reference layer picture parameter set when the picture level list-data flag indicates that scaling list data exists in the picture level. An exemplary syntax design to facilitate the embodiment is illustrated in FIG. 3. New syntax element, pps_base_pred_scaling_list_flag is introduced in the PPS. pps_base_pred_scaling_list_flag is signalled if pps_scaling_list_data_present_flag is 1. pps_base_pred_scaling_list_flag with a first value (e.g., 1) indicates that the scaling list data is inferred from the scaling list data in the reference layer PPS. pps_base_pred_scaling_list_flag with a second value (e.g., 0) indicates that scaling list data is present in the PPS. If the reference layer is the base layer and avc_base_layer_flag in vps_extension ( ) is 1 (i.e., the base layer conforms to the AVC standard), pps_base_pred_scaling_list_flag shall have a value of 0. When pps_base_pred_scaling_list_flag is not present, the value is inferred to be the second value (i.e., 0).

In the existing non-scalable coding standards, such as HEVC, the quantization matrix ID may be identified using the delta between the current matrix ID and a reference matrix ID. If the delta is 0, a default scaling list is used. Otherwise, the scaling list is inferred from the reference scaling list. In the third embodiment, the related semantics is modified to support the sharing of base-layer or reference layer scaling list, where a zero-valued delta will use the default scaling list only for the base layer; for higher layers, the scaling list is inferred from the reference-layer scaling list. When the delta is non-zero, the scaling list is inferred from the reference scaling list. An example of syntax design based on HEVC to facilitate the third embodiment is shown below. The semantics of the HEVC scaling list data syntax element, "scaling_list_pred_matrix_id_delta" is modified, as follows:

scaling_list_pred_matrix_id_delta [sizeId] [matrixId] specifies the reference scaling list used to derive ScalingList [sizeId] [matrixId] according to:

If scaling_list_pred_matrix_id_delta is equal to 0, the scaling list is inferred from the default scaling list ScalingList [sizeId] [matrixId] [i] as specified in the HEVC standard for i=0 . . . Min (64, (1<<(4+(sizeId<<1)))) when nuh_layer_id is 0 (i.e. base layer). When nul_layer_id is greater than 0 (i.e. enhancement layer), the scaling list is inferred from the reference layer scaling list ScalingList [sizeId] [matrixId] [i] for i=0 . . . Min (64, (1<<(4+(sizeId<<1)))).

Otherwise, the scaling list is inferred.

In the fourth embodiment, a new syntax element is used within scaling list data syntax to indicated whether the reference scaling list used to derive ScalingList is from a reference layer or not. For example, FIG. 4 illustrates an example according to the fourth embodiment, where the new syntax element, "base_pred_scaling_list_flag" is introduced. The syntax and semantics are described as follows. base_pred_scaling_list_flag is signalled if scaling_list_pred_mode_flag is 0. base_pred_scaling_list_flag having a value of 1 indicates that the reference scaling list used to derive ScalingList[sizeId] [matrixId] is from a reference layer. base_pred_scaling_list_flag having a value of 0 indicates the reference scaling list used to derive ScalingList [sizeId] [matrixId] is from the same layer. base_pred_scaling_list_flag shall be 0 if sizeId is 2 or 3, the reference layer is the base layer, and the value of avc_base_layer_flag in vps_extension ( ) is 1.

While various examples are illustrated for higher layers (i.e., enhancement layers) in a scalable video coding system to re-use the scaling list data from reference layer or base layer, the present invention is also applicable to three-dimensional/multi-view coding for dependent views (or enhancement views or predicted views to re-use the scaling list data from a reference view or base view. Beside directly reuse the scaling list data, the scaling list data of higher layers or dependent views can also be predicted or derived from a reference layer or reference view.

In single layer (view) video coding there are two types of predictions, i.e. Intra prediction and Inter prediction. When a block is Intra predicted, Intra scaling list with the corresponding size and colour space is applied. When a block is Inter predicted, Inter scaling list with the corresponding size and color space is applied. In scalable or 3D video coding, there is another prediction mode, i.e. inter-layer or inter-view texture prediction mode (or "Intra_BL" mode in prior art standard). In the present invention, the inter-layer or inter-view texture prediction mode is treated in the same way as Inter prediction mode. In other words, if a block is inter-layer or inter-view texture predicted, Inter scaling list with the corresponding size and color space is applied. Yet in another embodiment, inter-layer or inter-view texture predicted blocks can be treated as Intra predicted blocks, i.e. if a block is inter-layer (view) texture predicted, Intra scaling list with the corresponding size and color space is applied.

Figure 5:
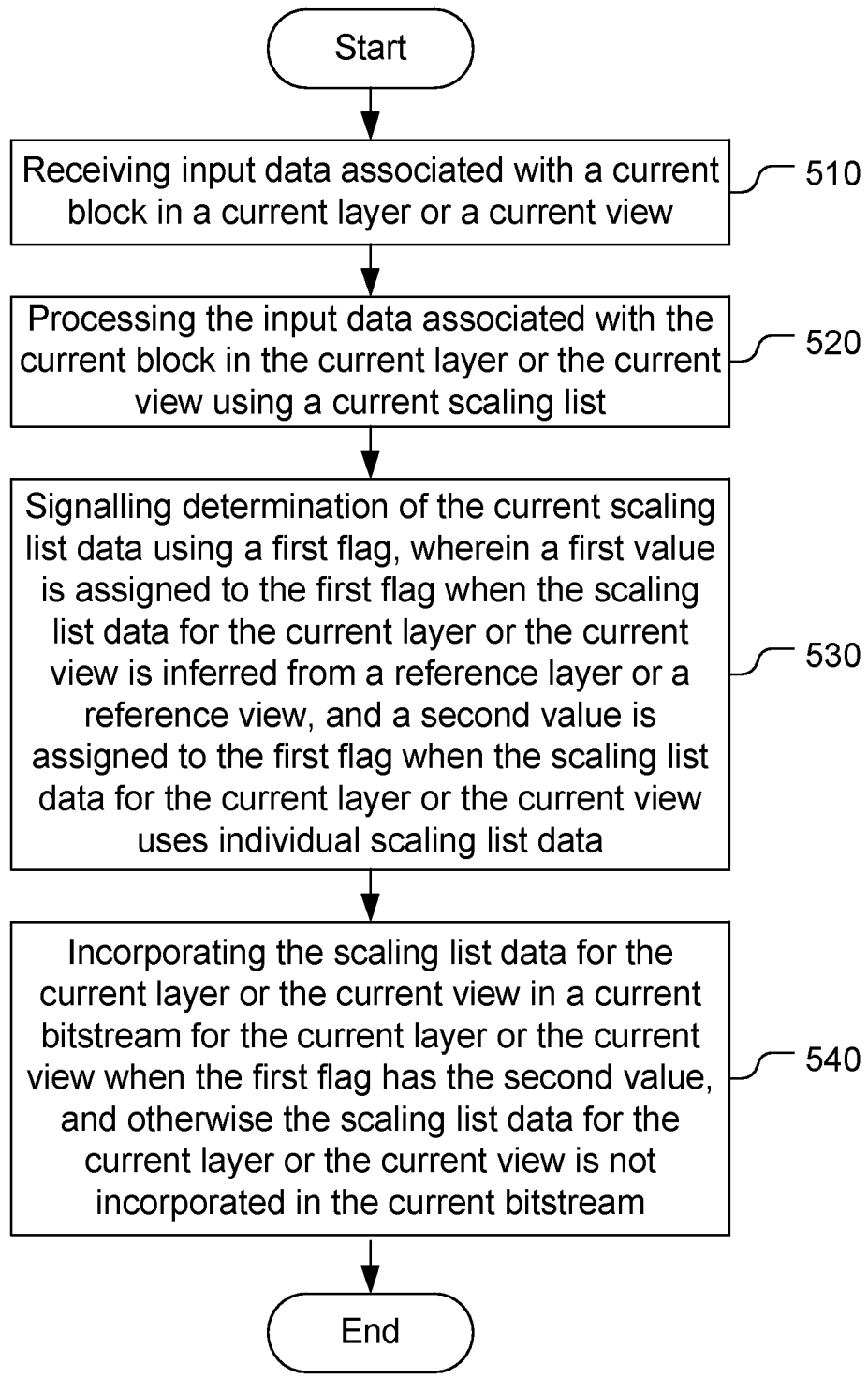
FIG. 5 illustrates an exemplary flowchart of a scalable or three-dimensional encoding system incorporating an embodiment of the present invention to support sharing of the scaling list data with a reference layer or a reference view.

FIG. 5 illustrates an exemplary flowchart of a scalable or three-dimensional encoding system incorporating an embodiment of the present invention to support sharing of the scaling list data from a reference layer or a reference view. The system receives input data associated with a current block in a current layer or a current view as shown in step 510. The input data may be received from memory or from other processing unit through an interface. The input data associated with the current block in the current layer or the current view is then processed using current scaling list data as shown in step 520. The determination of the current scaling list data is signalled using a first flag as shown in step 530, wherein a first value is assigned to the first flag when the scaling list data for the current layer or the current view is derived from a reference layer or a reference view, and a second value is assigned to the first flag when the scaling list data for the current layer or the current view uses individual scaling list data. The scaling list data for the current layer or the current view is incorporated in a current bitstream for the current layer or the current view when the first flag has the second value as shown in step 540, and otherwise the scaling list data for the current layer or the current view is not incorporated in the current bitstream.

Figure 6:
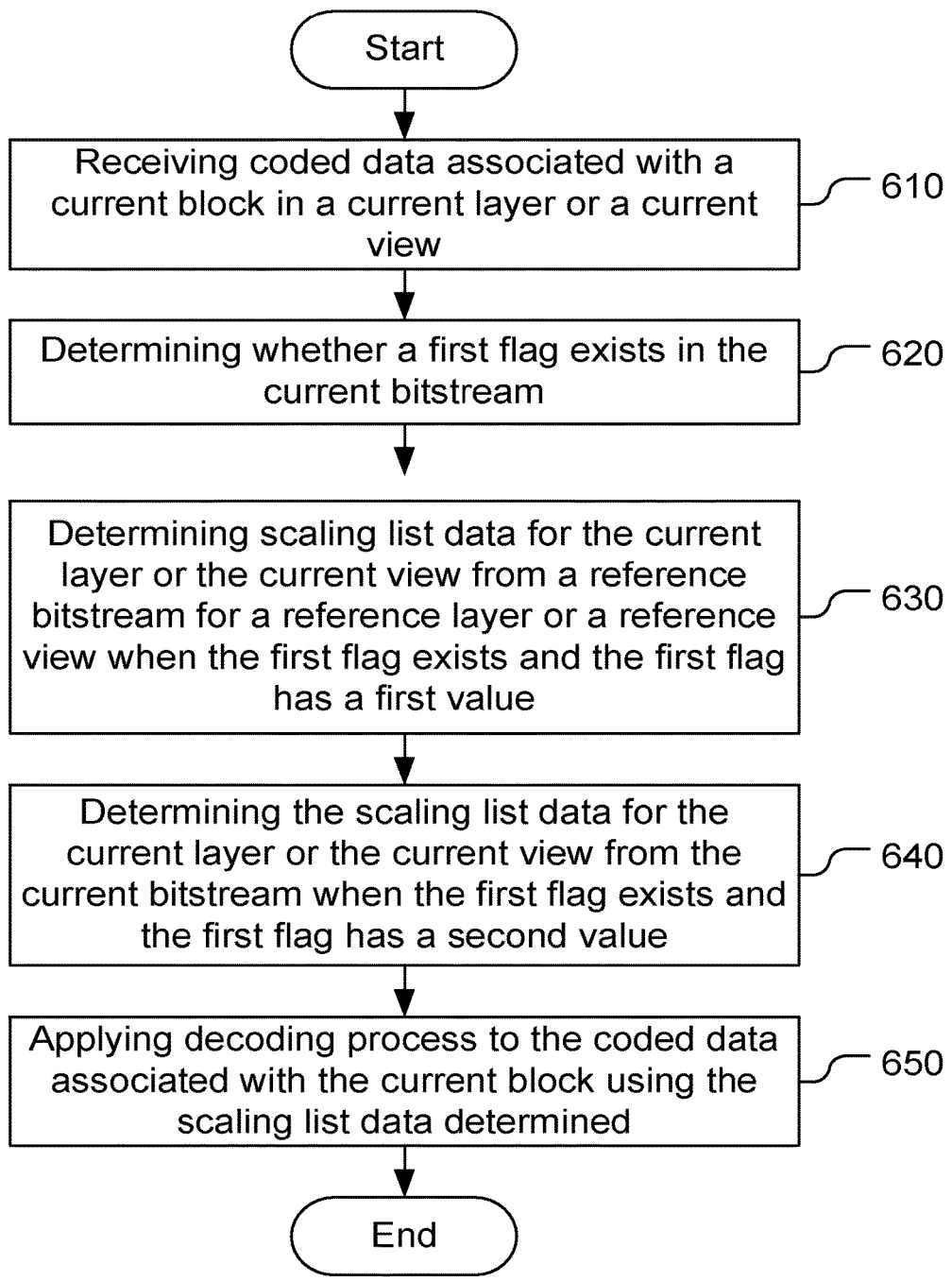
FIG. 6 illustrates an exemplary flowchart of a scalable or three-dimensional decoding system incorporating an embodiment of the present invention to support sharing of the scaling list data with a reference layer or a reference view.

FIG. 6 illustrates an exemplary flowchart of a scalable or three-dimensional decoding system incorporating an embodiment of the present invention to support sharing of the scaling list data from a reference layer or a reference view. The system receives coded data associated with a current block in a current layer or a current view from a current bitstream as shown in step 610. The coded data may be received from memory or from other processing unit through an interface. The system then determines whether a first flag exists in the current bitstream as shown step 620. When the first flag exists and the first flag has a first value, scaling list data for the current layer or the current view is determined from a reference bitstream for a reference layer or a reference view as shown in step 630. When the first flag exists and the first flag has a second value, the scaling list data for the current layer or the current view is determined from the current bitstream as shown in step 640. Decoding process is then applied to the coded data associated with the current block using the scaling list data determined as shown in step 650.

The flowcharts shown above are intended to illustrate examples of inter-layer or inter-view scaling list data sharing for scalable and three-dimensional video coding. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A method of scaling list data signaling for a scalable or three-dimensional video decoding system, wherein video data is configured into two or more layers or the video data comprises two or more views, the method comprising:
    receiving coded data associated with a current block in a current layer or a current view from a current bitstream;
    determining whether a first flag exists in a sequence parameter set (SPS) of the current bitstream;
    determining scaling list data for the current layer or the current view from a reference bitstream associated with the SPS of the current bitstream for a reference layer or a reference view when the first flag exists and the first flag has a first value;
    determining the scaling list data for the current layer or the current view from the SPS of the current bitstream when the first flag exists and the first flag has a second value;
    determining whether a second flag exists in a picture parameter set (PPS) of the current bitstream;
    determining the scaling list data for the current layer or the current view from a reference bitstream associated with the PPS of the current bitstream for a reference layer or a reference view when the second flag exists and the second flag has a first value;
    determining the scaling list data for the current layer or the current view from the PPS of the current bitstream when the second flag exists and the second flag has a second value;
    determining whether a third flag exists within the scaling list data, wherein the third flag is configured to indicate whether a reference scaling list that is used to derive a scaling list is from a reference layer or a same layer;
    determining that the reference scaling list that is used to derive the scaling list is from the reference layer when the third flag has a first value;
    determining that the reference scaling list that is used to derive the scaling list is from the same layer when the third flag has a second value; and
    applying decoding process to the coded data associated with the current block using the determined scaling list data.

2. The method of claim 1, wherein existence of the first flag is indicated by a scaling list data present flag in the current bitstream.

3. The method of claim 1, wherein the first flag is inferred to have the first value when the first flag is not present in the current bitstream.

4. A method of scaling list data signaling for a scalable or three-dimensional video encoding system, wherein video data is configured into two or more layers or the video data comprises two or more views, the method comprising:
    receiving input data associated with a current block in a current layer or a current view;
    processing the input data associated with the current block in the current layer or the current view using current scaling list data;
    signaling determination of the current scaling list data using a first flag, wherein a first value is assigned to the first flag when the scaling list data for the current layer or the current view is derived from a sequence parameter set (SPS) reference layer or a reference view, and a second value is assigned to the first flag when the current layer or the current view uses own scaling list data, and the scaling list data is to be incorporated in a SPS of a current bit stream;
    signaling determination of the current scaling list data using a second flag, wherein a first value is assigned to the second flag when the scaling list data for the current layer or the current view is derived from a picture parameter set (PPS) reference layer or a reference view, and a second value is assigned to the second flag when the current layer or the current view uses own scaling list data, and the scaling list data is to be incorporated in a PPS of the current bit stream;
    indicate whether a reference scaling list that is used to derive a scaling list is from a reference layer or a same layer using a third flag, wherein a first value is assigned to the third flag when the reference scaling list that is used to derive the scaling list is from the reference layer, and a second value is assigned to the third flag when the reference scaling list that is used to derive the scaling list is from the same layer;
    incorporating the scaling list data for the current layer or the current view in the SPS of the current bitstream for the current layer or the current view when the first flag has the second value; and
    incorporating the scaling list data for the current layer or the current view in the PPS of the current bitstream for the current layer or the current view when the second flag has the second value.

5. The method of claim 4, wherein existence of the first flag is indicated by a scaling list data present flag in the current bitstream.

6. The method of claim 4, wherein the first flag is inferred to have the first value when the first flag is not present in the current bitstream.

7. An apparatus for scaling list data signaling in a scalable or three-dimensional video decoding system, wherein video data is configured into two or more layers or the video data comprises two or more views, the apparatus comprising one or more electronic circuits, wherein said one or more electronic circuits are configured to:
    receive coded data associated with a current block in a current layer or a current view from a current bitstream;
    determine whether a first flag exists in a sequence parameter set (SPS) first level of the current bitstream;
    determine scaling list data for the current layer or the current view from a reference bitstream associated with the SPS of the current bitstream for a reference layer or a reference view when the first flag exists and the first flag has a first value;

determine the scaling list data for the current layer or the current view from the SPS of the current bitstream when the first flag exists and the first flag has a second value;

determine whether a second flag exists in a picture parameter set (PPS) of the current bitstream;

determine the scaling list data for the current layer or the current view from a reference bitstream associated with the PPS of the current bitstream for a reference layer or a reference view when the second flag exists and the second flag has a first value;

determine the scaling list data for the current layer or the current view from the PPS of the current bitstream when the second flag exists and the second flag has a second value;

determine whether a third flag exists within the scaling list data, wherein the third flag is configured to indicate whether a reference scaling list that is used to derive a scaling list is from a reference layer or a same layer;

determine that the reference scaling list that is used to derive the scaling list is from the reference layer when the third flag has a first value;

determine that the reference scaling list that is used to derive the scaling list is from the same layer when the third flag has a second value; and apply decoding process to the coded data associated with the current block using the determined scaling list data.

8. The apparatus of claim 7, wherein existence of the first flag is indicated by a scaling list data present flag in the current bitstream.

9. The apparatus of claim 7, wherein the first flag is inferred to have the first value when the first flag is not present in the current bitstream.

* * * * *